US005481506A

United States Patent [19]

Kita

[11] Patent Number: 5,481,506

[45] Date of Patent: Jan. 2, 1996

[54] ELECTRONIC DEVICES WITH SENSORS

[75] Inventor: Kazunori Kita, Mizuhomachi, Japan

[73] Assignee: Casio Computer Co., Ltd., Tokyo, Japan

[21] Appl. No.: 22,718

[22] Filed: Feb. 23, 1993

[30] Foreign Application Priority Data

Feb. 26, 1992 [JP] Japan .................................... 4-075549

[51] Int. Cl.$^6$ ................................ G04B 47/06; G01L 9/00

[52] U.S. Cl. ................................ 368/10; 368/11; 368/278; 73/754

[58] Field of Search ................................ 365/10, 11, 276, 365/278, 294–296; 73/291, 384, 386, 437, 753, 754

[56] References Cited

U.S. PATENT DOCUMENTS

| | | | |
|---|---|---|---|
| 4,236,236 | 11/1980 | Jaunin . | |
| 4,352,168 | 9/1982 | Anderson | 368/10 |
| 4,407,295 | 10/1983 | Steuer et al. . | |
| 4,586,827 | 5/1986 | Hirsch et al. | 368/282 |
| 4,611,200 | 9/1986 | Stilwell | 368/11 |
| 4,733,383 | 7/1988 | Waterburt | 368/10 |
| 4,783,772 | 11/1988 | Umemoto et al. | 368/11 |
| 4,787,072 | 11/1988 | Jou | 368/76 |
| 4,807,639 | 2/1989 | Shimizu et al. . | |
| 4,835,716 | 5/1989 | Tamaki et al. . | |
| 4,876,677 | 10/1989 | Morita | 368/87 |
| 4,962,469 | 10/1990 | Ono et al. . | |
| 5,355,352 | 10/1994 | Kobayashi et al. | 368/281 |
| 5,357,488 | 10/1994 | Udo et al. | 368/11 |

FOREIGN PATENT DOCUMENTS

| | | |
|---|---|---|
| 0165381 | 12/1985 | European Pat. Off. . |
| 2148617 | 5/1985 | United Kingdom . |

*Primary Examiner*—Vit W. Miska
*Attorney, Agent, or Firm*—Frishauf, Holtz, Goodman, Langer & Chick

[57] ABSTRACT

A sensor unit which comprises a sensor, and a detector for detecting an output from the sensor is attached removably to a device case with a display. Data on the basis of detection signals from the detector of the sensor unit is displayed on the display of the case. Thus, only a desired sensor can be provided in the case to thereby reduce the size and power consumption.

18 Claims, 21 Drawing Sheets

ELECTRONIC DEVICES WITH SENSORS

BACKGROUND OF THE INVENTION

The present invention relates to electronic devices with sensors which have the functions of sensing temperature and barometric pressure and displaying data on them.

Recently, electronic wrist watches having various functions have been developed. For example, electronic wrist watches with a temperature sensor (for example, U.S. Pat. No. 4,236,236), an electronic wrist watch with a pressure sensor to measure a height and a water depth where the wrist watch is placed (U.S. Pat. No. 4,835,716), a wrist watch with a pulse sensor (U.S. Pat. No. 4,807,639) and a wrist watch with a sensor to measure the number of paces (U.S. Pat. No. 4,962,469).

An electronic device with different sensor functions is convenient since the user can know a plurality of data items and the manufacture of such devices is desired. However, since sensors equal in number to the required types of sensor functions are required in this case, the device with such sensors would be large-sized and increase in power consumption. If some of the sensors which are not required are provided, they are useless or cannot be used effectively.

SUMMARY OF THE INVENTION

The present invention is made in view of the above situation. It is an object of the present invention to provide an electronic device which is capable of using only a required sensor and which is capable of achieving a reduction in size and power consumption.

According to the present invention, the above object is achieved by an electronic device comprising:

casing means;

sensor unit means, detachably mounted on said casing means, including sensor element means and detector means for detecting an output of said sensor element means to generate a detection signal; and display means provided on said casing means, for displaying data based on the detection signal generated by said detector means of said sensor unit means.

According to this arrangement, the sensor unit means with the sensor is removably attached to the case, so that only a required sensor function can be provided in the device to thereby reduce the size and power consumption.

Figure 1:
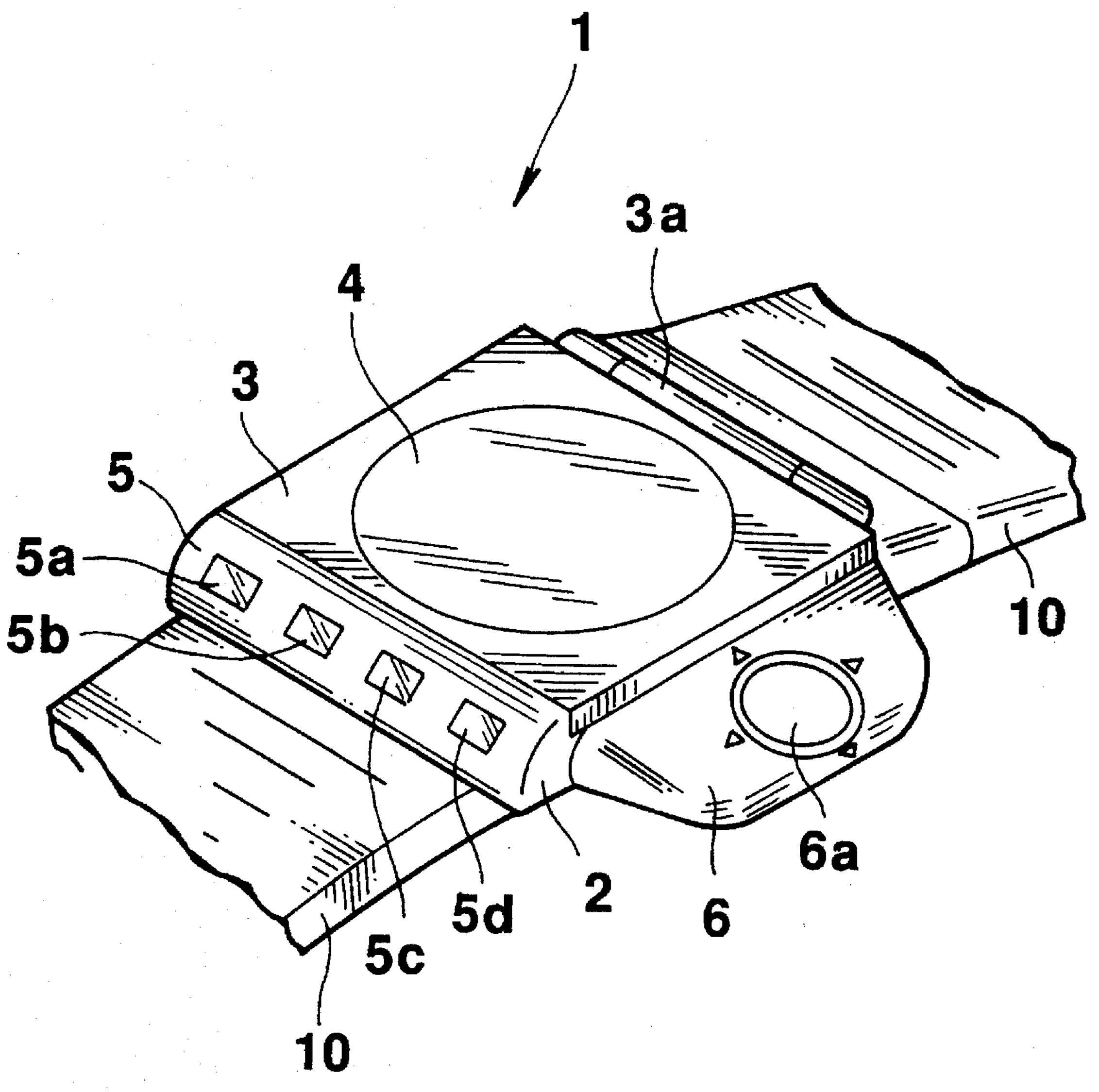
FIG. 1 iS a perspective view of a first embodiment of an electronic device with a sensor according to the present invention.

DESCRIPTION OF THE PREFERRED EMBODIMENTS (1) First Embodiment:

A first embodiment of an electronic device according to the present invention will be described below with reference to FIG. 1–20. FIGS, 1 and 2 show the first embodiment taking the form of a wrist watch, The wrist watch 1 is provided with a case 2 with bands 10 attached to the corresponding sides of the case. A closure 3 is attached through a hinge shaft 3*a* to an upper surface of the case 2 so as to be turnable around the hinge shaft 3*a* for closing/opening purposes. The closure 3 has a display 4 thereon. FIG. 3 shows the display 4 which is provided with a data display 4*a*, a calendar display unit 4*b* and a time display unit 4*c* for digital display of corresponding data. The data display 4*a* displays data from a sensor unit 9 to be described later in more detail, and in the illustrated embodiment, temperature.

The sensor unit 9 is adapted to be accommodated in the case 2. As shown in FIG. 2, the case 2 has a recess 7 which accommodates the sensor unit 9 below the closure 3 when the same is closed. In the present embodiment, the sensor unit 9 takes the form of a disc and hence the recess 7 has a complementary form. A plurality of connection terminals 8 is provided in the recess 7 so as to be electrically connected to a plurality of connection electrodes 13 (FIGS. 4 and 5) provided in the bottom of the sensor unit 9.

Figure 2:
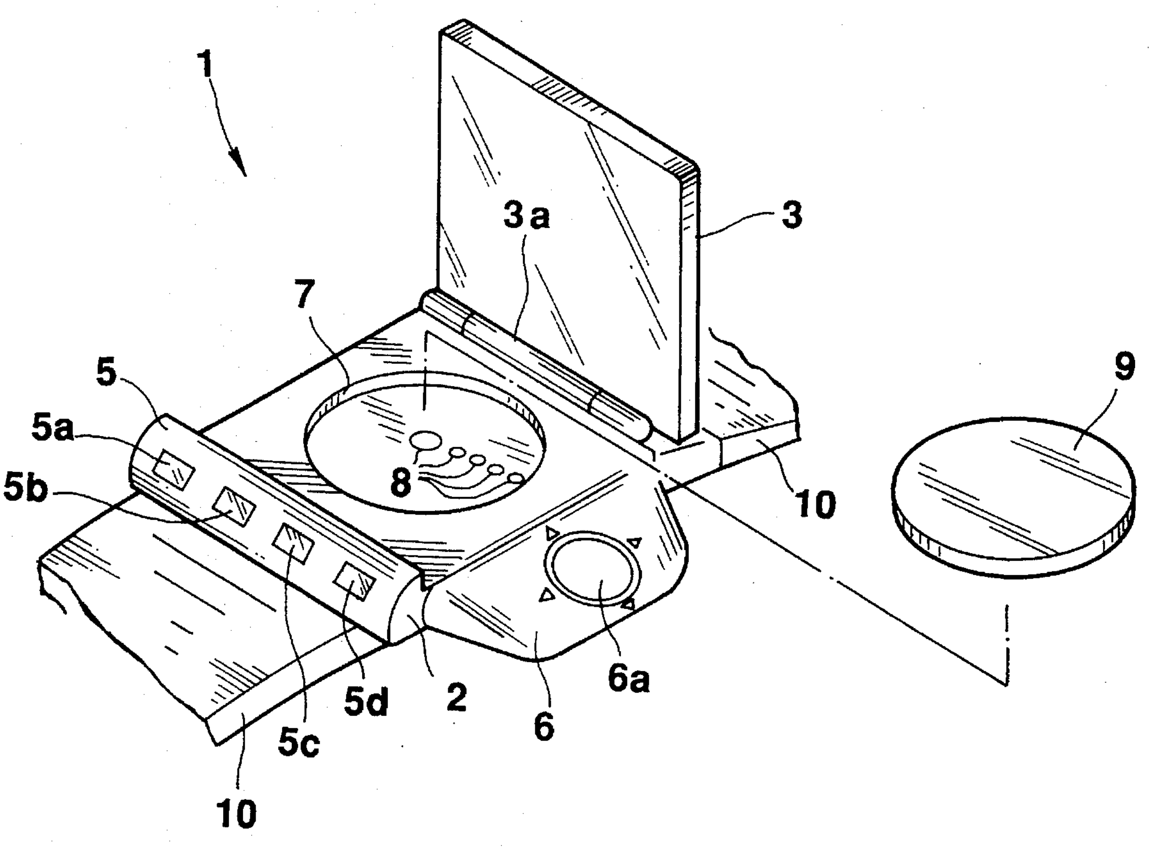
FIG. 2 is a perspective view of the electronic device of FIG. 1 with its closure being open.
Figure 3:
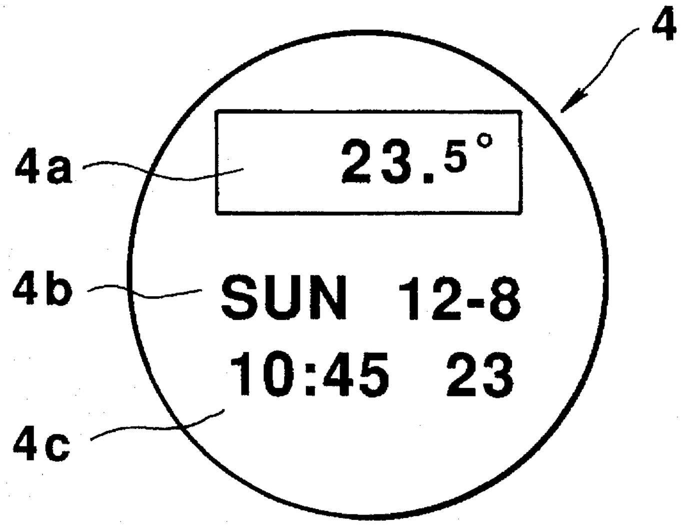
FIG. 3 is a front view of a display of the electronic device of FIG. 1.

In FIGS. 1 and 2, reference numeral 5 denotes a push button key unit disposed on the side of the case 2 at 6 o'clock and including push button switches 5*a* , 5*b*, 5*c* and 5*d* which perform switching on/off operations on the basis of the corresponding key depressing operations. Reference numeral 6*a* denotes a cursor key provided on a extending portion 6 of the case extending at 3 o'clock and having four equi-spaced operating points 6*a* disposed along the periphery of a circle. In the present embodiment, the cursor key 6*a* is operated to display data stored in the sensor unit 9.

Figure 4:
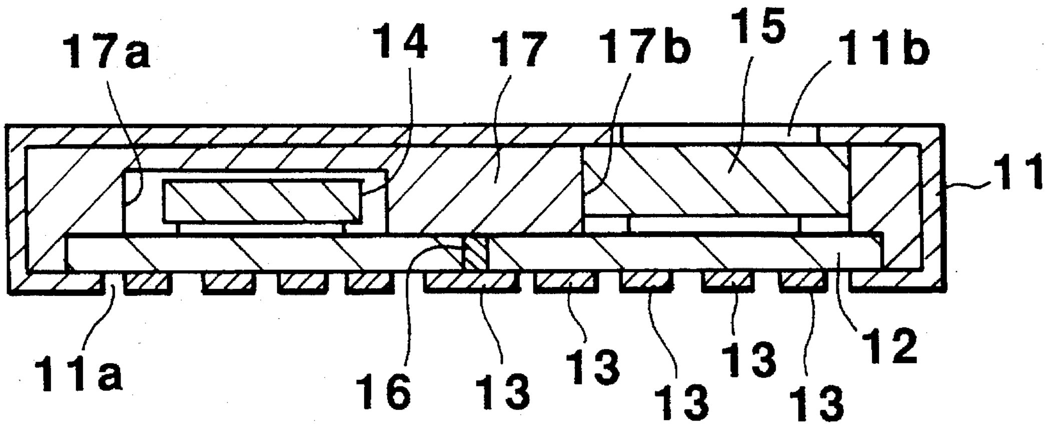
FIG. 4 is a cross-sectional view of the sensor unit of the electronic device of FIG. 1.
Figure 5:
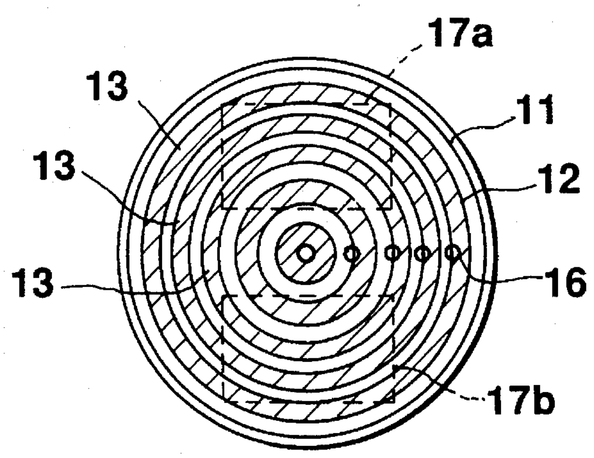
FIG. 5 is a bottom view of the sensor unit of FIG. 4.

FIGS. 4 and 5 show the structure of the sensor unit 9 which is provided with a disc-like metal sensor case 11, a synthetic resin intermediate frame 17 placed in the sensor case 11 and a circuit board 12 held between the intermediate frame 17 and the sensor case 11. The intermediate frame 17 has a recess 17*a* on one side of its center (its left-side portion in FIG. 4) where an LSI 14 attached to the circuit board 12 is placed. The intermediate frame 17 has another recess 17*b* on the other side of its center which accommodates a sensor 15 electrically connected to the LSI 14 of the circuit board 12. The sensor 15 senses various data such as data on temperature and barometric pressure, to be described later in more detail. In order to sense such data, the sensor case 11 has an opening 11*b* through which a sensing surface of the sensor 15 placed in the case 11 communicates with the outside.

The plurality of connection electrodes 13 is disposed in concentrically on the bottom of the circuit board 12 in order to electrically connect the connection terminals 8 (FIG. 2) of the case 2. The connection electrodes 13 are connected to the LSI 14 through a through hole 16 in the circuit board 12. In FIG. 4, reference numeral 11*a* denotes an opening provided in the sensor case 11 to expose those connection electrodes 13.

Figure 6:
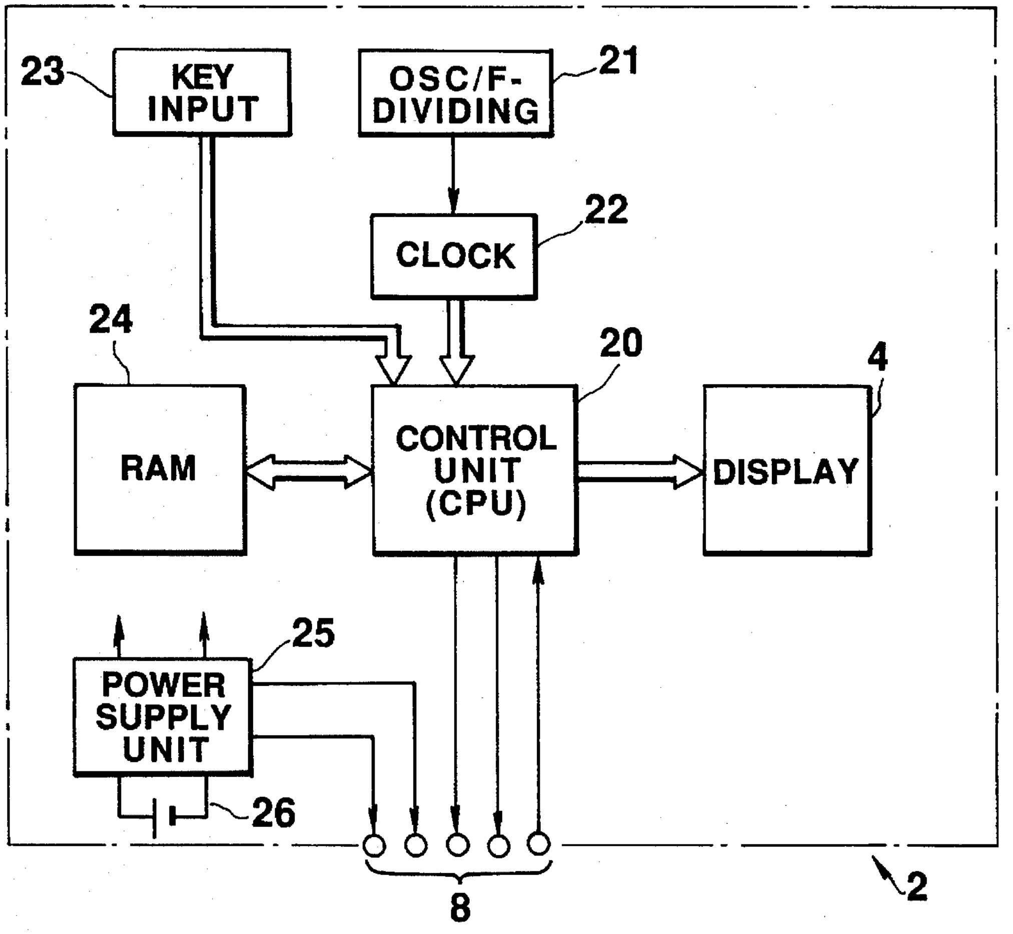
FIG. 6 is a block diagram of the internal circuit of the electronic device of FIG. 1.

FIG. 6 is a block diagram of the electronic device in the case 2. The device is provided with a control unit (CPU) 20 which controls the overall device, and an oscillating/frequency dividing unit 21 and a clock 22 fulfilling a clocking function. Reference numeral 23 denotes a key input unit corresponding to push button switches 5*a*, 5*b*, 5*c* and 5*d* and a cursor key 6*a* (FIGS. 1 and 2). It outputs to the control unit 20 signals from the push button switches 5*a*, 5*b*, 5*c*, 5*d* and cursor key 6*a* . The control unit 20 drives the sensor 15 of the sensor unit 9.

Therefore, the key input unit 23 and the control unit 20 are drive signal supply means which supplies signals to drive the sensor 15. Reference numeral 24 denotes a RAM as a storage, and 25, a power supply unit which supplies power from a battery 26 placed in the case 2 to the respective units concerned.

Figure 7:
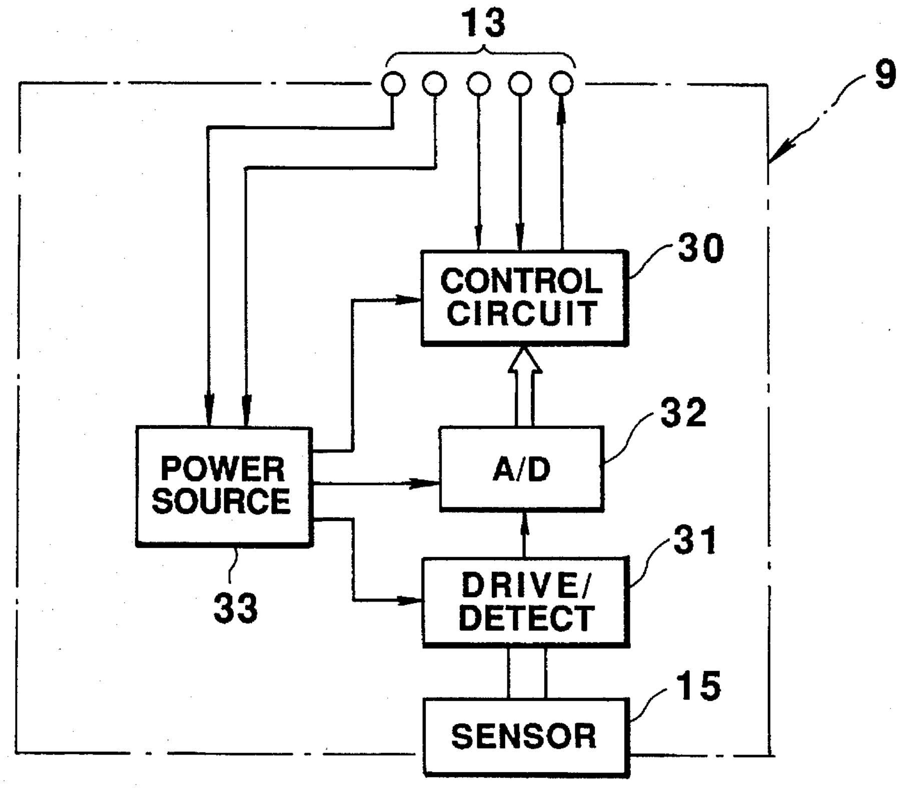
FIG. 7 is a block diagram of the internal circuit of the sensor unit of FIG. 4.

FIG. 7 is a block diagram of the internal structure of the sensor unit 9. It is provided with a drive/detection unit 31 which detects a signal output from the sensor 15; an analog-to-digital (A/D) converter 32 which converts an analog detection output from the drive/detection unit 31 to a digital signal; and a control circuit 30 which converts a digital signal from the A/D convertor 32 to a serial signal and outputs same, and controls the overall sensor unit 9. In this arrangement, an analog signal from the sensor 15 is converted to a digital signal, which is output in the form of a serial signal to the case 2, so that the number of connection lines which electrically connects the sensor unit 9 and the case 2 is small and the overall structure is simple. In the present embodiment, the drive/detection unit 31 is connected in parallel with the sensor 15 to output a drive signal to the sensor 15 to drive same in addition to the detecting operation, mentioned above. Reference numeral 33 denotes a power source which supplies power to the control circuit 30, A/D converter 32 and the drive/detection unit 31.

The power source 33 receives power from the power supply unit 25 in the case 2 through the connection electrodes 13 and supplies power to the respective elements concerned. Thus, the power source which drives the respective elements concerned is not required to be provided in the sensor unit 9, so that the sensor unit 9 is reduced in size and the overall structure is simplified.

As shown in FIG. 2, the sensor unit 9, constructed as described above, is placed in the recess 7 in the case 2 such that the connection electrodes 13 connect the connection terminals 8 in the case 2. Therefore, the sensor 15 is enabled to detect the data concerned and the detected data is display on a data display 4*a* of the display unit 4 in the case 2.

Figure 8:
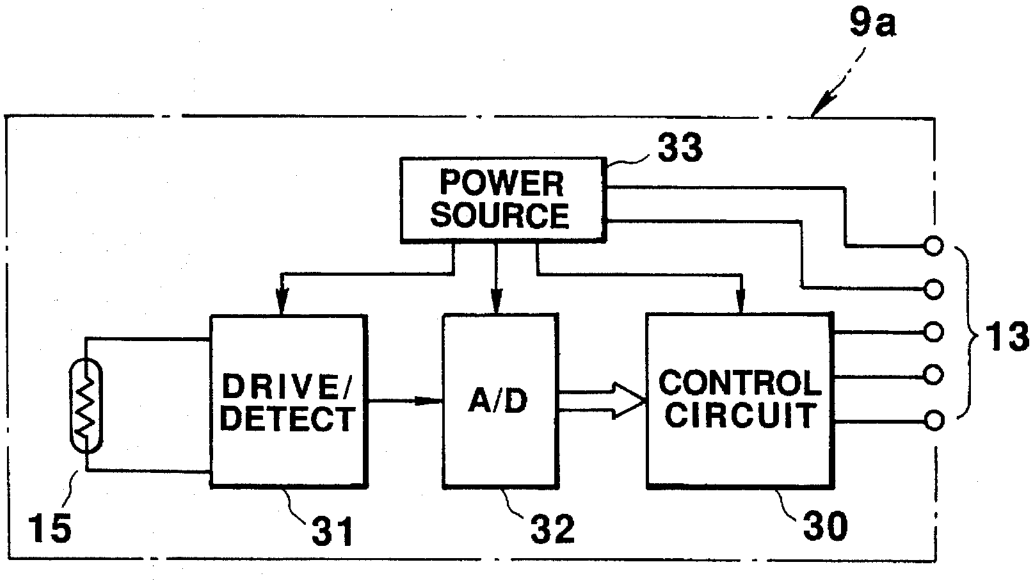
FIG. 8 is a block diagram of the internal structure of a temperature sensor unit.
Figure 9:
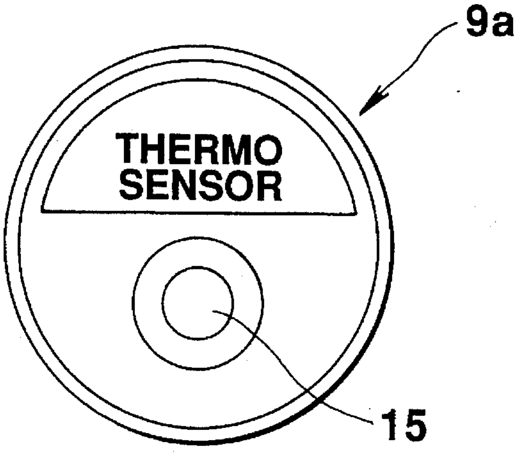
FIG. 9 is a bottom view of the temperature sensor unit of FIG. 8.
Figure 10:
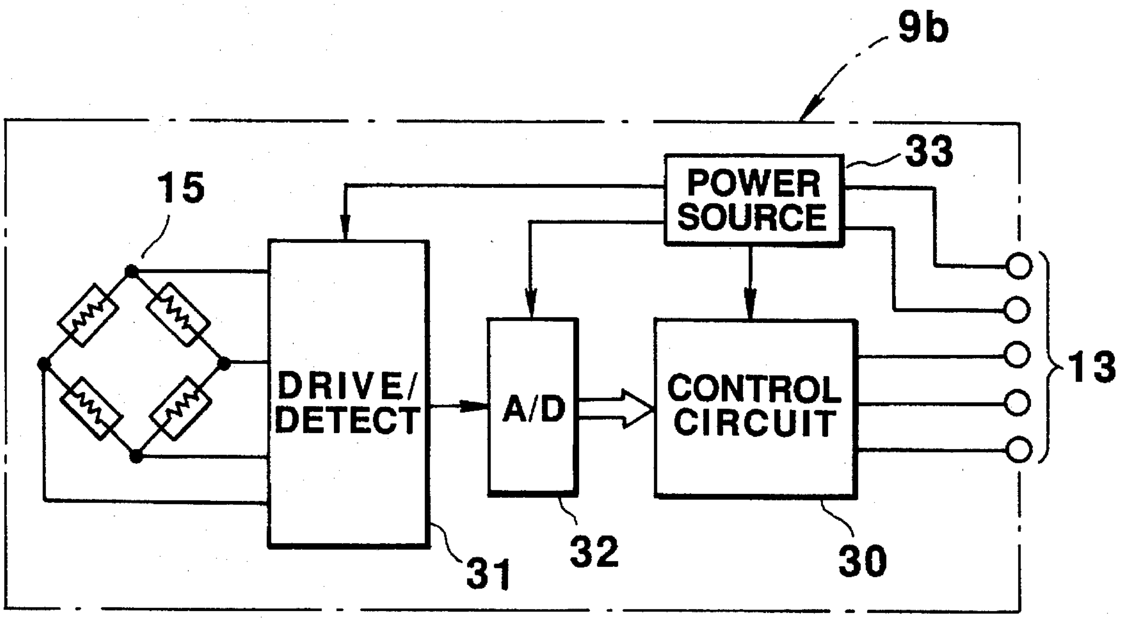
FIG. 10 is a block diagram of the internal structure of a barometric pressure sensor unit.
Figure 11:
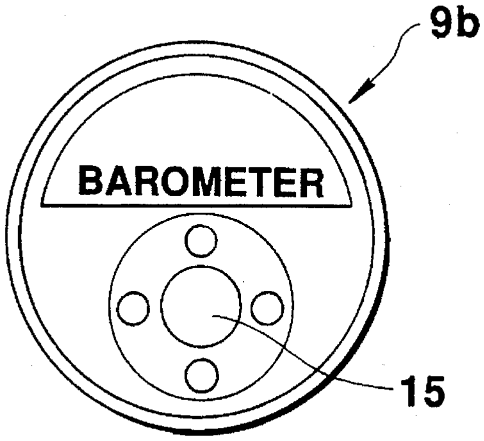
FIG. 11 is a bottom view of the barometric pressure sensor unit of FIG. 10.
Figure 12:
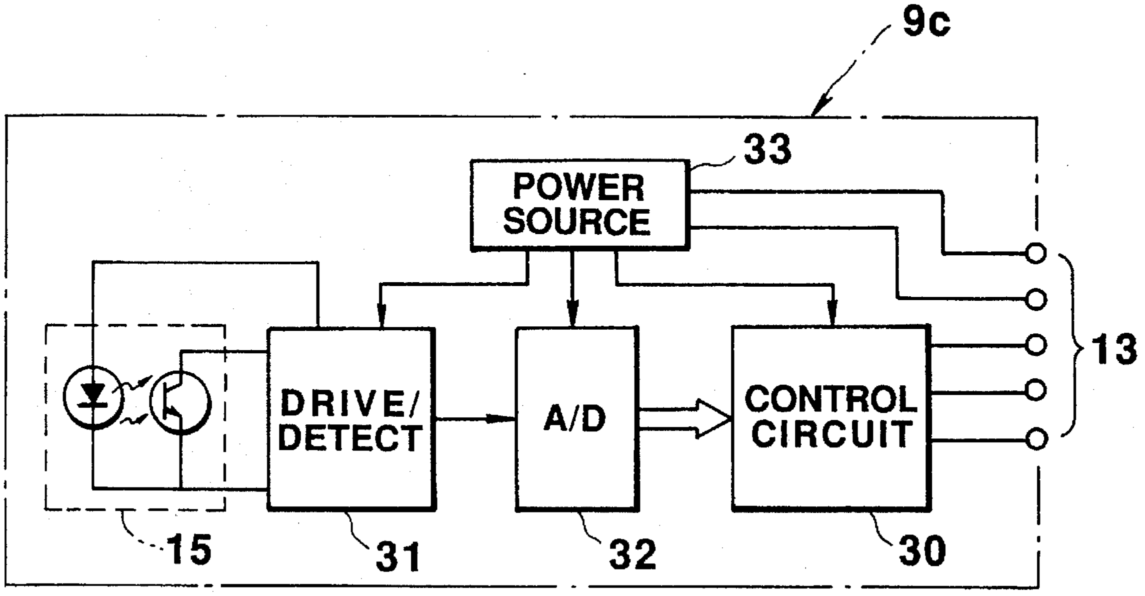
FIG. 12 is a block diagram of the internal structure of a pulse sensor unit.
Figure 13:
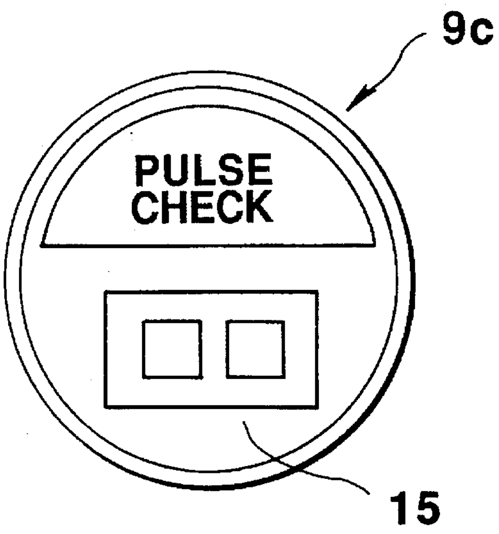
FIG. 13 is a bottom view of the pulse sensor unit of FIG. 12.

FIGS. 8–13 show several examples of the sensor unit 9. FIGS. 8 and 9 show a temperature sensor unit 9*a* which uses a temperature thermistor as the sensor 15. FIGS. 10 and 11 show a barometric pressure sensor unit 9*b* which uses a semiconductor pressure sensor as the sensor 15. FIGS. 12 and 13 show a pulse sensor unit 9*c* which uses a photocoupler which includes a light emitting diode and a phototransistor as the sensor 15. As just described above, by inserting a required sensor unit 9 into the case 1, the required data is detected and any one of the various sensor functions can be selected, so that this device is convenient in use. Since a plurality of sensors is not required to be placed together in the case 2, the case 2 is small and power consumption is low compared to the conventional device.

Figure 14:
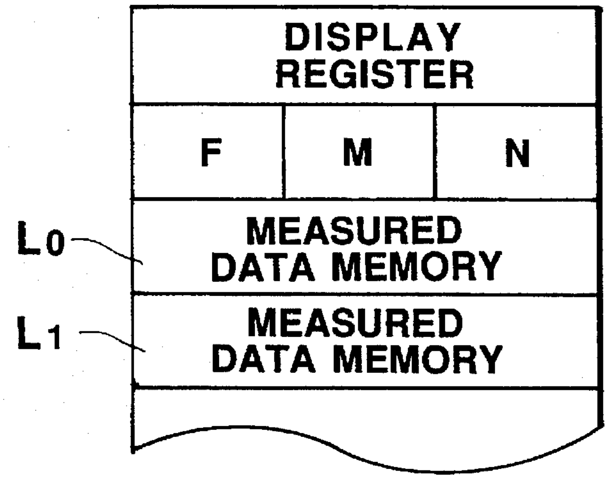
FIG. 14 shows the structure of a RAM of FIG. 6.

FIG. 14 shows the internal structure of the RAM 24 in the case 2. A "display register" stores data displayed on the display 4. An "F" register stores data on whether the sensor unit 9 is in a sensing state. If so, it stores "1" while if not, it stores 0"0".

An "N" register stores data on the inserted type of sensor unit 9. If it stores "0", it shows that the temperature sensor unit 9*a* is inserted; when it stores "1", it indicates that the barometric pressure sensor unit 9*b* is inserted; when it stores "2", it indicates that a pulse sensor unit 9*c* is inserted.

Registers L0, L1 . . . are "measured data memories" which store data measured by the sensor 15.

The "M" register stores data on whether the pulse sensor unit 9*c* is accommodated in the recess and whether a switch 5*c* which starts the measurement of a pulse is switched on. If it stores "0", it indicates that the switch 5*c* is not operated while if it stores "1", it indicates that the switch 5*c* is operated on.

Figure 15:
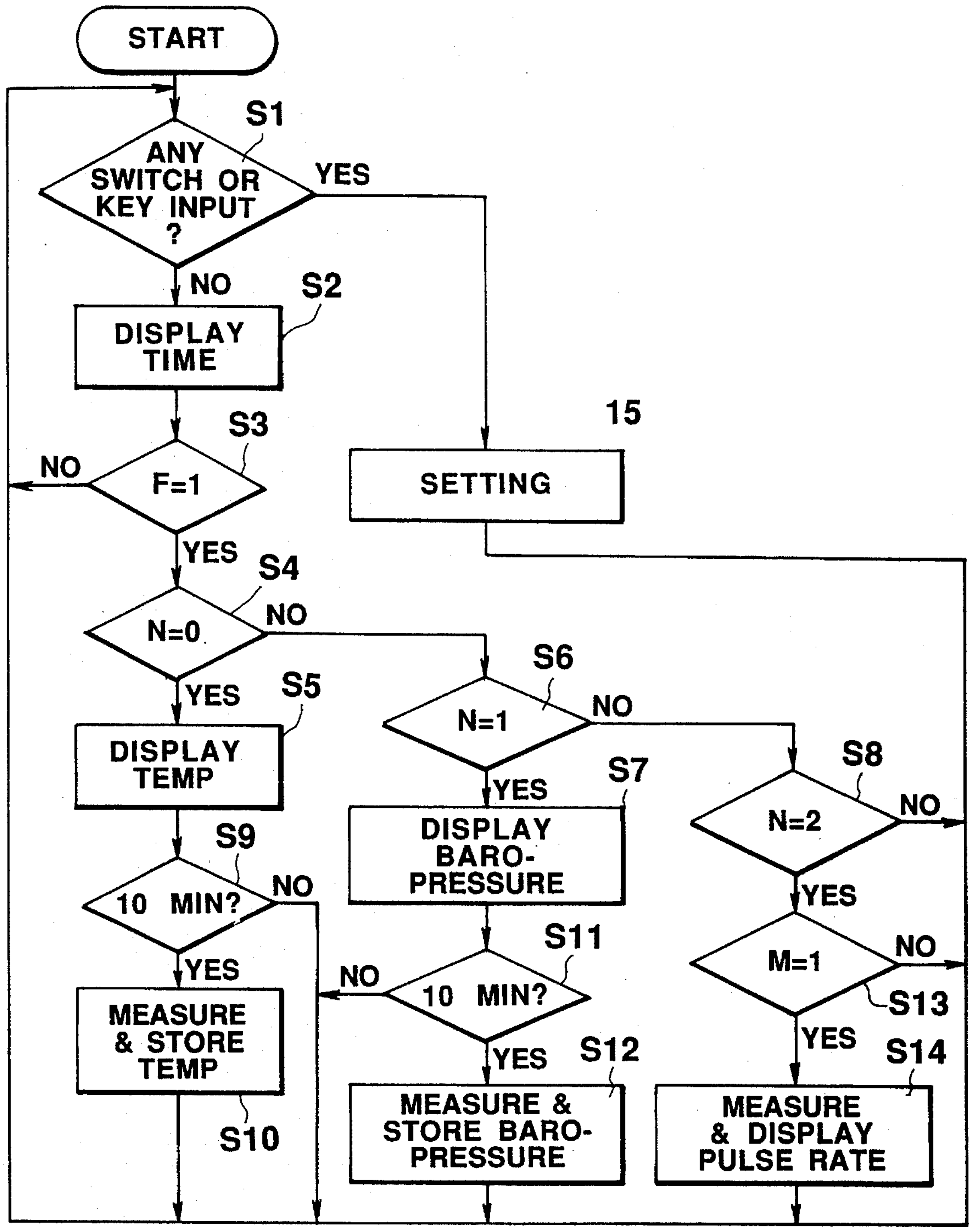
FIG. 15 is a general flowchart indicative of the operation of the FIG. 6 electronic device.

In operation, FIG. 15 shows an overall flowchart for control by the control unit 20. Step S1 shows a process which senses whether the switch is on or a key is depressed. When there is an input signal from the key input unit 23 to the control unit 20, control passes immediately to step S15 directed to a setting process while if there is no switch input or key input, control passes to step S2 seqq. to indicate data on time and data measured by the sensor.

Figure 16:
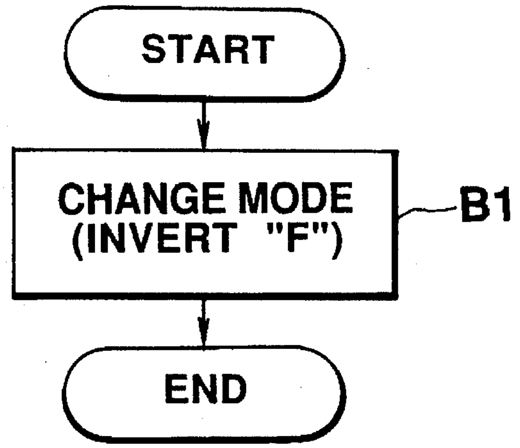
FIG. 16 is a flowchart indicative of the operation of the electronic device performed when a switch *5a* is operated in the setting step of the flowchart of FIG. 15.

The setting process at step S15 corresponds to a respective one of processes performed by the push button switches 5*a*–5*d* and cursor 6*a*. For example, when the push button switch 5*a* is operated, the contents of the "F" register which stores data on whether the sensor is sensing data at step B1, as shown in FIG. 16, are inverted, that is, from "1" to "0" or vice versa.

Figure 17:
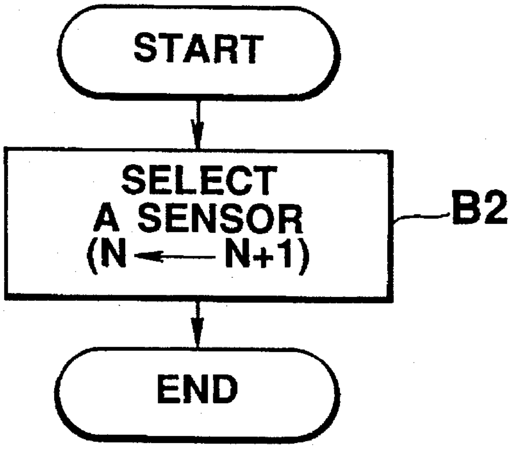
FIG. 17 is a flowchart indicative of the operation of the electronic device performed when a switch *5b* is operated in the setting step of the flowchart of FIG. 15.

When the push button switch 5*b* is operated, the contents of the "N" register are incremented by one, as shown at step B2 of FIG. 17. When the temperature sensor unit 9*a* of FIG. 8 is used, the contents of the "N" register are set at 0 by the operation of the push button switch 5*b*. Thus, the control unit 20 provides control for temperature measurement, to be described later in more detail.

When the barometric pressure sensor unit 9*b* of FIG. 10 or the pulse sensor unit 9*c* of FIG. 12 is used, the contents of the "N" register are set at N=1 or N=2 by the operation of the push button switch 5*b*.

Figure 18:
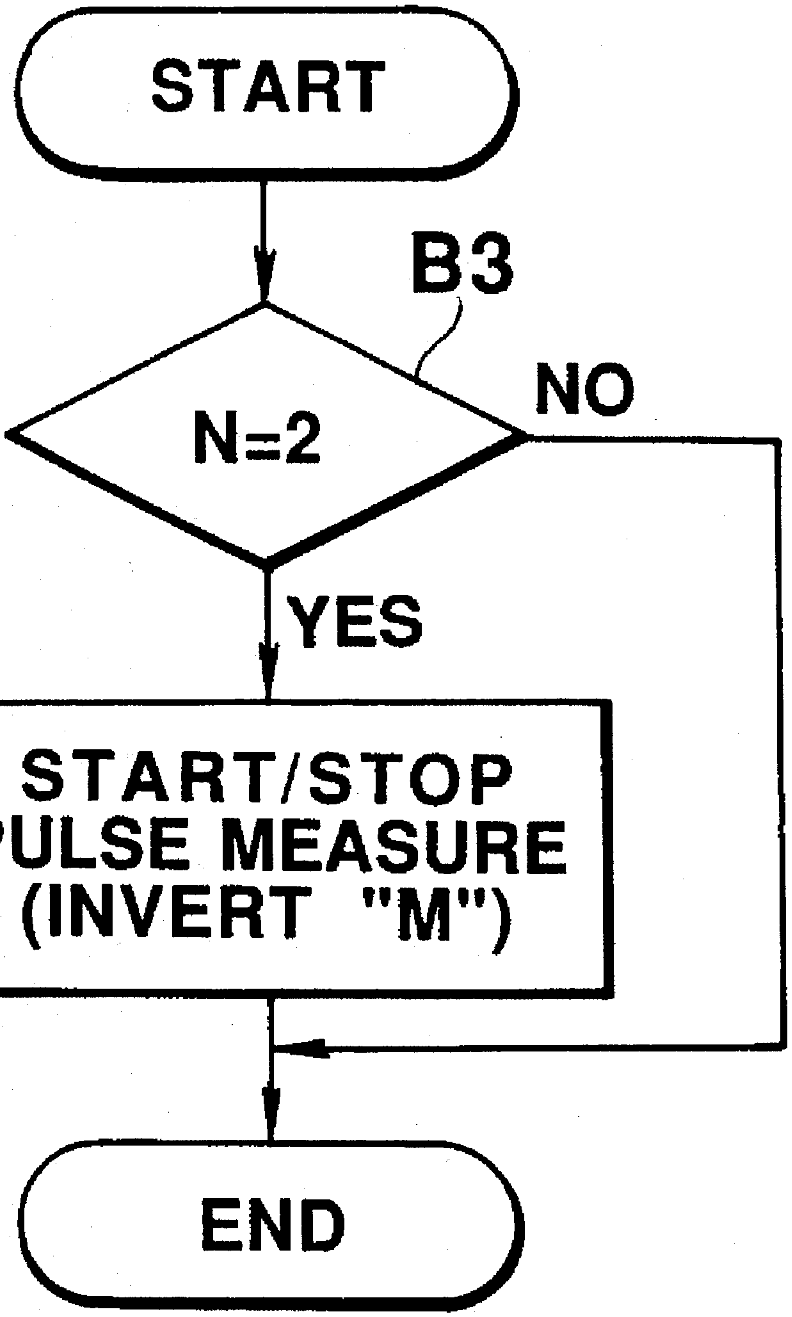
FIG. 18 is a flowchart indicative of the operation of the electronic device performed when a switch *5c* is operated in the setting step of the flowchart of FIG. 15.

When the push button switch 5*c* is operated, it is determined at step B3 whether N=2 or whether the pulse sensor unit 9 is inserted, as shown in FIG. 18. If N=2, the contents of the "M" register which stores data on the fact that the switch 5*c* has been operated are inverted or from "1" to "0" or vice versa to detect the pulse only when M is 1, as will be described later in more detail.

Referring again to FIG. 15, when it is determined that there is no switch input or key input at step S1, control passes to step S2, where data on the current time clocked by the clock 22 is delivered to the display register of the RAM 24 to thereby display the time on the display 4. Then control passes to step S3, where it is determined whether the "F" register is 1 or not. When it is determined at step S3 that the "F" register is 0, indicating that the sensor is in a non-measurement mode, control returns to step S1. When it is determined at step S3 that the "F" register is 1, indicating that the sensor is in a measurement mode, control passes to step S4, where it is determined whether the numerical value data of the "N" register is "0". When N=0, control passes to step S5, where the temperature measured and is displayed at step S10 to be described later in more detail. If N is not 0 at step S4, control passes to step S6, where it is determined whether N=1. If so, control passes to step S7, where the barometric pressure measured and is displayed at step S12 to be described later in more detail. When it is determined at step S6 that N is not 1, control passes to S8, where it is determined whether N=2. If so, it is determined at step S13 whether the numerical value of the "M" register is "1". If so, the pulses are measured and data on its pulse rate is displayed at step S14.

When the temperature is displayed at step S5, it is checked at step S9 whether the measurement timing is at intervals of 10 minutes. If so, the control unit 20 outputs to the sensor unit 9*a* a command signal to measure the temperature and stores data on the temperature measured by the sensor unit 9*a* and in the measured data memory L0 of the RAM 24. At this time, when the immediately preceding measured data (ten minutes earlier) is stored in the measured data memory L0, those data are shifted sequentially to the measured data memory L1 and then stored in the measured data memory L10. When the processing at step S10 ends, control returns to step S1. When control again passes through steps S1–S4 to step S5, the measured data stored in the measured data memory L0 is delivered to the display register and displayed on the display 4*a*. That is, when N=0, the temperature is measured and the measured temperature is displayed at intervals of 10 minutes.

When the barometric pressure sensor unit 9*b* of FIG. 10 is used and N=1 is detected at step S6, control passes through steps S7, S11 and S12 which are similar to steps S5, S9 and S10, as mentioned above, and which involve measurement of the barometric pressure in place of the temperature and further description thereof will be omitted.

When the pulse sensor unit 9*c* of FIG. 12 is used and N=2, control passes from step S8 to S13, where it is determined whether the value of the "M" register is "1" or "0". Only when it is "1", control passes to step S14, where the pulses from a finger placed on the sensor are sensed and the number of pulses per minute (pulse rate) is calculated from the measured pulse signals, and the data on the pulse rate is stored in the measured data memory L0 and displayed.

The data stored in the measured data memories L0, 1, . . . are sequentially displayed by the cursor key 6*a* on the display 4. While in the above embodiment the measurement of the temperature, barometric pressure and pulse rate has been described, measurement may be made using other sensors, and sensors blocks for humidity, mouth smell, ultraviolet rays.

Figure 19:
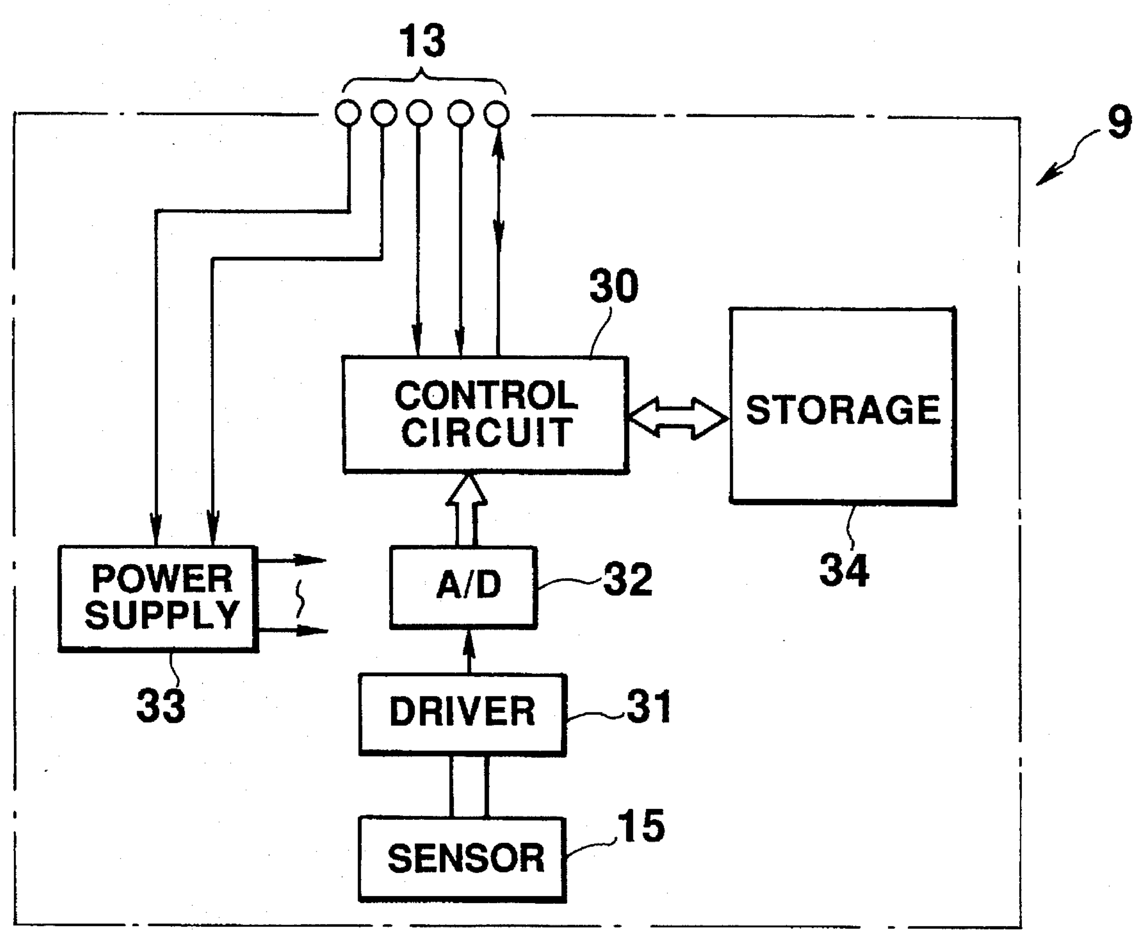
FIG. 19 shows a modification of the sensor unit of the first embodiment.

FIG. 19 shows a modification of the sensor unit 9 of the first embodiment. In this modification, the sensor unit 9 is provided with a storage 34 therein. The storage 34 stores measured data fed from the sensor 15 through the control unit 30. Provision of such storage 34 serves to store various types of data and required data can be displayed on the display 4 of the case 2, so that convenience and practicality is further improved.

Figure 20:
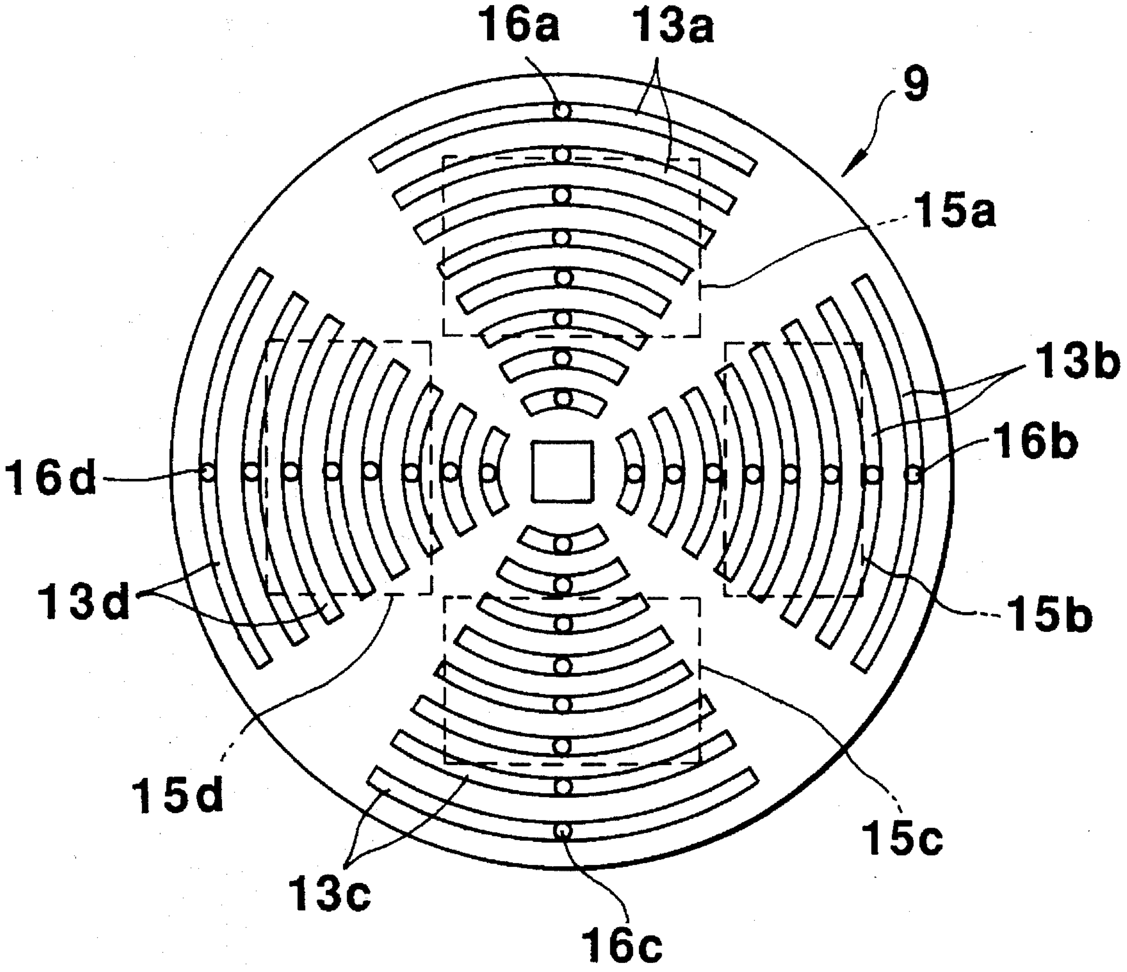
FIG. 20 shows a further modification of the sensor unit of the first embodiment.

FIG. 20 shows another modification of the sensor unit 9 of the first embodiment. This modification takes the form of a disc in which a plurality of sensors 15*a*, 15*b*, 15*c*, 15*d* which sense different data (four sensors in FIG. 20) is provided. Connection electrodes which are electrically connected to the connection terminals 8 of the case 2 are provided on the bottom of the sensor unit 9 such that connection electrodes 13*a*, 13*b*, 13*c*, 13*d* correspond to sensors 15*a*, 15*b*, 15*c*, 15*d*, respectively. Reference numerals 16*a*, 16*b*, 16*c*, 16*d* denote through holes through which the sensors 15*a*, 15*b*, 15*c*, 15*d* are communicated to the connection electrodes 13*a*, 13*b*, 13*c*, 13*d*, respectively. Such arrangement is provided with the plurality of sensors in a single sensor unit, operation of a required key of the key input unit 23 (FIG. 6) on the case 2 side serves to select a required sensor and command the measurement and display of the required data. Therefore, the frequency of exchange of sensor unit 9 is reduced and the operability is improved.

Second Embodiment:

Referring to FIGS. 21–26, a second embodiment of the electronic device according to the present invention will be described. The same reference numeral is used to denote the same element of the first and second embodiments through FIGS. 1–20 and 21–26 and further description thereof will be omitted.

The second embodiment is different from the first embodiment in that in the first embodiment the type of the sensor unit accommodated in the recess 7 in the case 2 is designated by a manually operated push button switch while in the second embodiment a required one of the types of sensor units 40*a*, 40*b*, 40*c* accommodated in the recess 7 in the case 2 is automatically determined to perform the drive of the required sensor and the display of data on the sensor.

Figure 22:
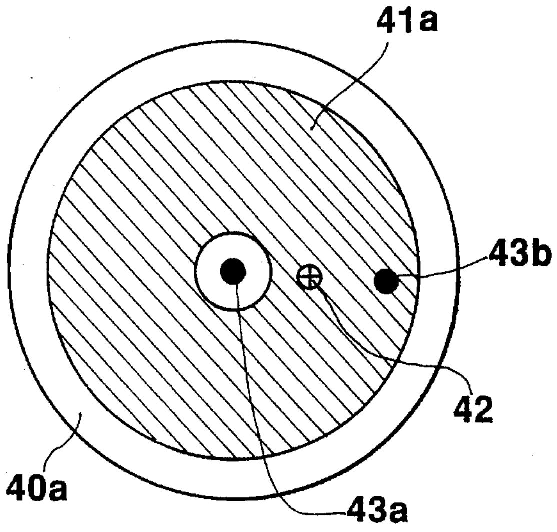
FIG. 22 is a plan view of a theremo sensor unit.
Figure 23:
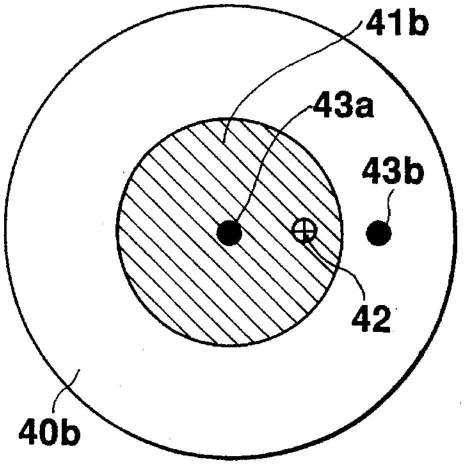
FIG. 23 is a plan view of a barometric pressure sensor unit.
Figure 24:
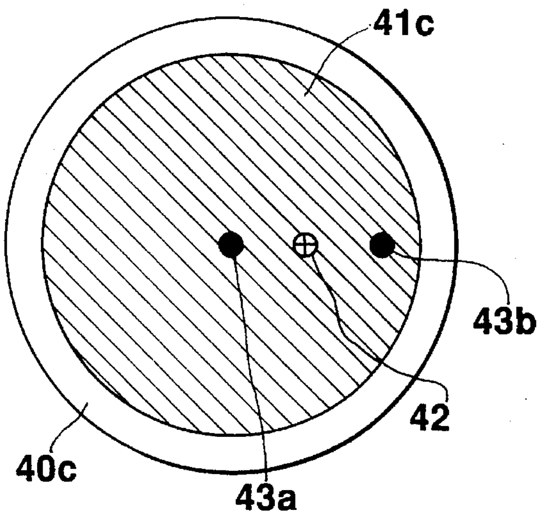
FIG. 24 is a plan view of an azimuth sensor unit.

FIGS. 22–24 show sensor units 40*a*, 40*b*, 40*c* of the second embodiment. These sensor units are different from the sensor unit 9 of the first embodiment in that conductors 41*a*, 41*b*, 41*c* having different shapes in conformity to the functions of the sensor units 40*a*, 40*b*, 40*c* are formed on the other surface of the sensor units 40*a*, 40*b*, 40*c* from the surface of the sensor units 40_a_, 40_b_, 40_c_ on which the connection electrodes 13 of the sensor units 40_a_, 40_b_, 40_c_ are provided.

In more detail, FIG. 22 shows a temperature sensor unit 40_a_, which has a built-in temperature sensor as the sensor and which has a ring-like conductor 41_a_ provided on an upper surface of the sensor unit 40_a_.

FIG. 23 shows a barometric pressure sensor unit 40_b_ which has a built-in semiconductor pressure sensor as the sensor and which has a circular conductive member 41_b_, having a diameter which is half of the outer diameter of the sensor unit 40_b_ provided on an upper surface of the sensor unit 40_b_.

FIG. 24 shows an azimuth sensor unit 40_c_ which has a built-in earth magnetism sensor as the sensor and which has a circular conductive member 41_c_ having a diameter which is half of the outer diameter of the conductive member 41_a_ of the temperature sensor unit 40_a_ provided on an upper surface of the sensor unit 40_c_.

Figure 21:
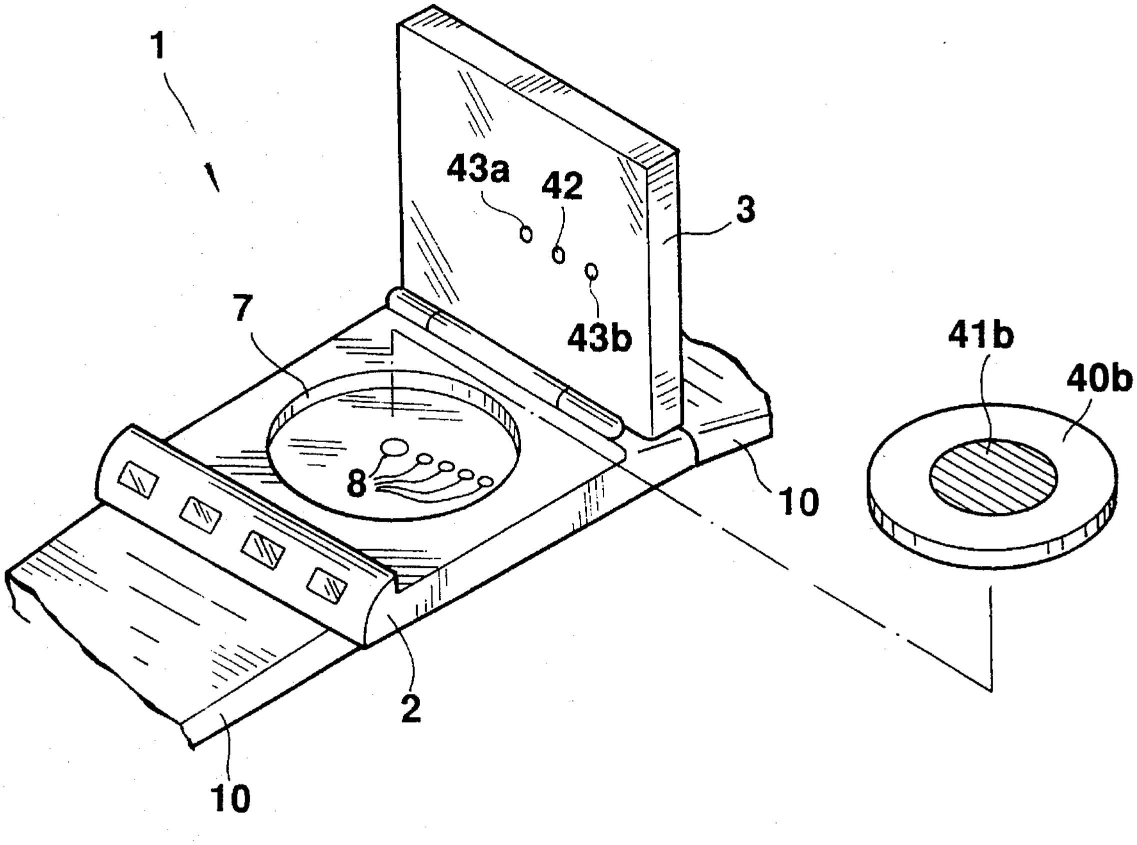
FIG. 21 is a perspective view of a second embodiment of the electronic device having a sensor function according to the present invention with its closure being open.

As shown in FIG. 21, one output terminal 42 and two input terminals 43_a_, 43_b_ extend from the recess-side surface of the closure 3.

As will be obvious from FIGS. 22–24, the input terminal 43_a_ is positioned at the center of each of the sensor units 40_a_, 40_b_, 40_c_. The input terminal 43_b_ is positioned within the extent of each of the conductors 41_a_, 41_c_ of the sensor unit 40_a_, 40_c_. The output terminal 42_a_ is positioned between the input terminals 43_a_, 43_b_ and at the position where it contacts the conductors 41_a_, 41_b_, 41_c_ of any one of the sensor blocks 40_a_, 40_b_, 40_c_ which is accommodated.

Figure 25:
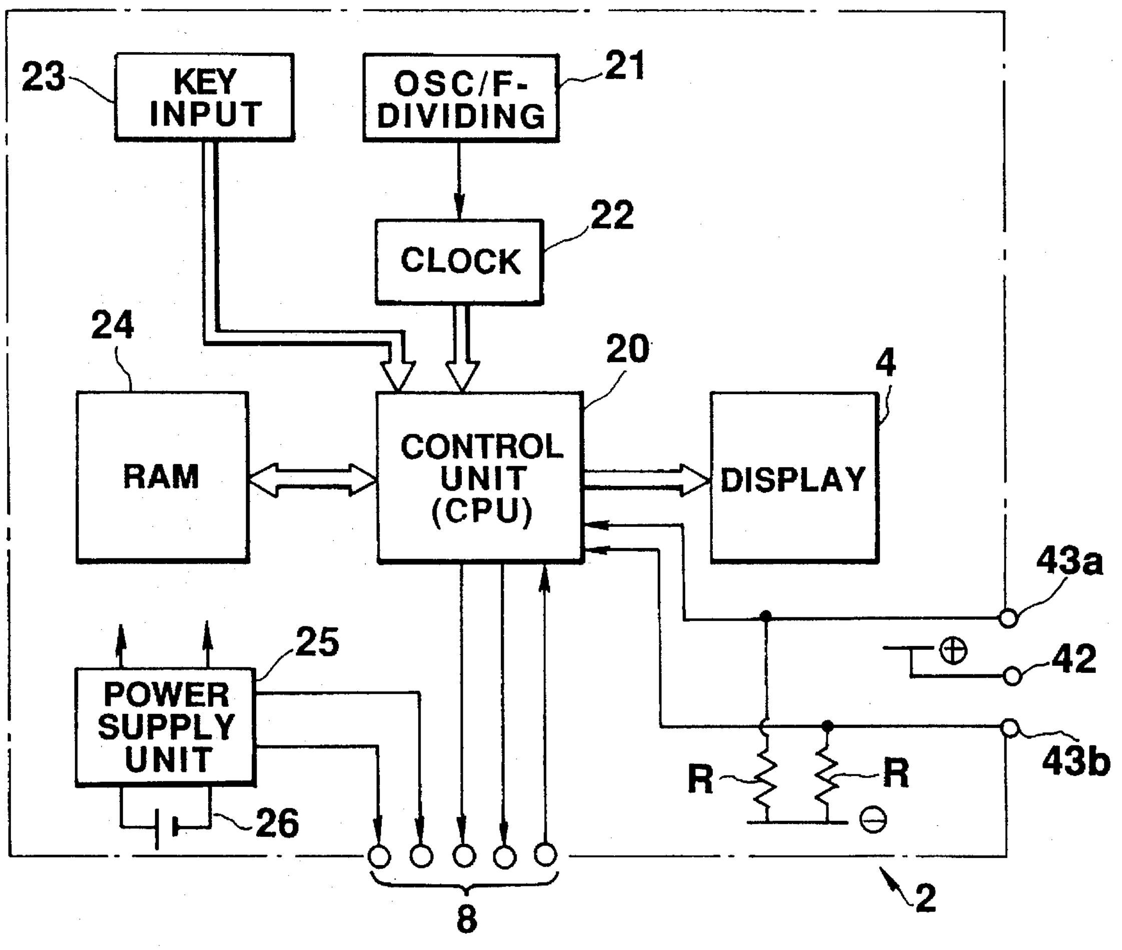
FIG. 25 is a block diagram of the internal structure of the electronic device of FIG. 21.

FIG. 25 is a block diagram of the circuit structure of the electronic device of the second embodiment, which is a combination of the first embodiment and the output terminal 42, input terminals 43_a_, 43_b_ and connection circuits for the respective terminals.

The output terminal 42 is connected to a high voltage level. The input terminals 43_a_, 43_b_ are each connected to the control unit 20 and connected also through a pull-down resistor R to a low voltage level.

Thus, when any one of the sensor units 40_a_, 40_b_, 40_c_ is accommodated in the recess 7, the two input terminals 43_a_, 43_b_ are at the low voltage level. If the temperature sensor unit 40_a_ is accommodated, the input terminal 43_a_ is maintained at the low voltage level while the input terminal 43_b_ electrically contacts the output terminal 42 and is placed at the high level. When the barometric pressure sensor unit 40_b_ is accommodated, both the input terminals 43_a_, 43_b_ electrically contact the output terminal 42 and are placed at the high voltage level. When the azimuth sensor unit 40_c_ is accommodated, the input terminal 43_a_ electrically contacts the output terminal 42 and is placed at the high voltage level while the input terminal 43_b_ electrically contacts the output terminal 42 and is placed at the high level.

The operation of the electronic device of the second embodiment will be described below.

Figure 26:
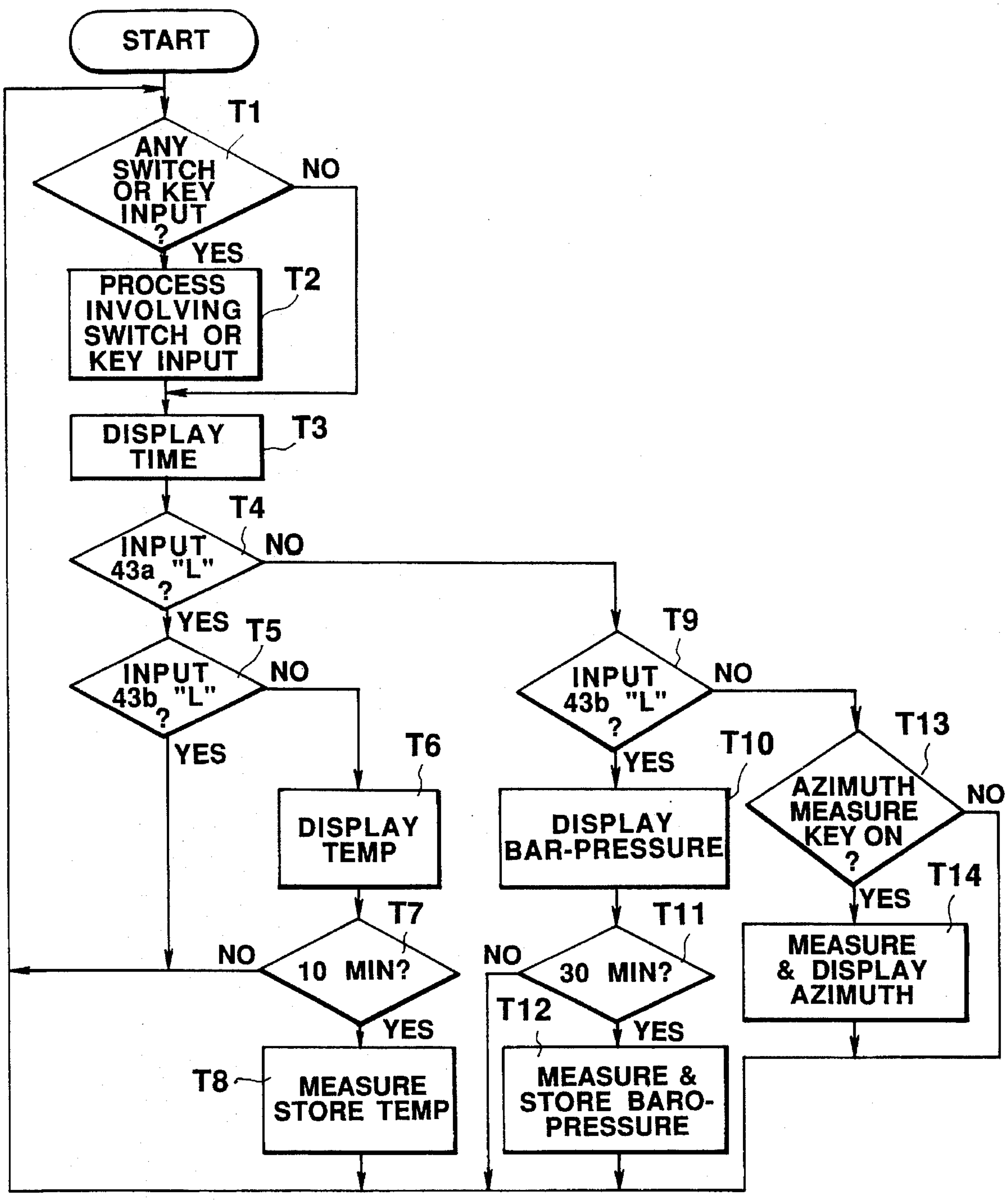
FIG. 26 is a general flowchart indicative of the operation of the electronic device of FIG. 25.

FIG. 26 is an overall flowchart indicative of the operation of the electronic device controlled by the control unit 20. At step T1 it is determined whether there is any switch input or key input. If so, control passes to step T2, where a process involving the switch input or key input is performed. Control then passes to step T3, where the current time is displayed. If it is determined at step T2 that there is no key input, control passes directly to the step T3 involving the process for displaying the current time.

In the time display process at step T3, the control unit 20 causes the display 4 to display data on the current time clocked by the clock 22.

Control then passes to step T4, where it is determined whether the input terminal 43_a_ is at the low level. When either no sensor unit is accommodated in the recess 7 or the temperature sensor unit 40_a_ is accommodated, the input terminal 43_a_ is at the low voltage level. Therefore, control passes to step T5, where it is determined whether the input terminal 43_b_ is at the low voltage level.

If no sensor unit is accommodated in the recess 7, the input terminal 43_b_ is at the low voltage level. Thus, control returns from step T5 to step T1.

If the temperature sensor block 40_a_ is accommodated, the input terminal 43_b_ is at the high level. Thus, control passes from step T5 to T6, where the data on the temperature stored in the measured data memory on the RAM 24 is displayed. Control then passes to step T7, where it is determined whether it is now at a measurement timing which occurs at intervals of 10 minutes. If so, control passes to step T8, where the control unit causes the temperature sensor of the sensor unit 40_a_ to measure the temperature and stores the data on the temperature in the measured data memory of the RAM 24. After the processing at step T8 it is determined at step T7 that it is now not at a measurement timing, control returns to step T1.

When either the barometric pressure sensor unit 40_b_ or the azimuth sensor unit 40_c_ is accommodated in the recess 7, it is determined at step T4 that the input terminal 43_a_ is not at the low level. Control then passes to step T9, where it is determined whether the input terminal 43_b_ is at the low level.

When the barometric pressure sensor 40_b_ is accommodated, the input terminal 43_b_ is at the low voltage level. Thus, control passes to T10, where the barometric pressure whose data is stored in the measured data memory of the RAM 24 is displayed. Control then passes to step T11, where it is determined whether it is now at a measurement timing which occurs at intervals of 30 minutes. If so, control passes to step T12, where the semiconductor pressure sensor of the sensor unit 40_b_ measures the pressure and the control unit stores the data on the pressure in the measured data memory of the RAM 24. After the process at step T12, or when it is determined at step T11 that it is now not at a measurement timing, control returns to step T1.

If the azimuth sensor unit 40_c_ is accommodated, it is determined at step T9 that the input terminal 43_b_ is not at the low voltage level. Control then passes to step T13, where it is determined whether the azimuth measurement key is operated. If so, control passes to step T14, where an earth magnetism sensor senses earth magnetism, and the control unit calculates and displays the azimuth from the earth magnetism. Thereafter, control returns to step T1. If it is determined at step T13 that no azimuth measurement key is operated, control also returns to step T1.

Third Embodiment:

Referring to FIGS. 27–33, a third embodiment of the electronic device according to the present invention will be described below. The same reference numeral is used to identify the same element of the first and third embodiments and further description thereof will be omitted.

The third embodiment automatically determines the respective types of the sensor units 50_a_, 50_b_ and 50_c_ accommodated in the recess 7 in the case 2 as the second embodiment does. The third embodiment is different from the second embodiment in that in the third embodiment the sensor unit 50_a_, 50_b_, 50_c_ have differently shaped raises 51_a_, 51_b_, 51_c_ a respective one of which is determined in order to determine the accommodated type of the sensor unit while in the second embodiment differently shaped conductors are provided to determine the respective types of the sensor units.

Figure 28:
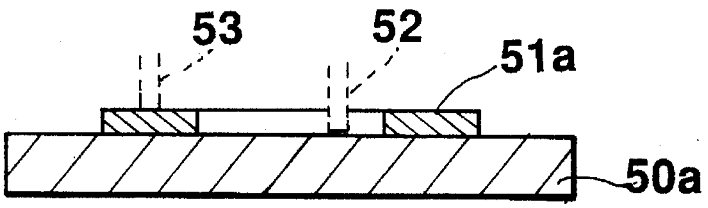
FIG. 28 is a plan view of a barometric sensor unit.

In more detail, the raises 51*a*, 51*b*, 51*c* differently shaped in conformity to the respective types of the sensor units 50*a*, 50*b*, 50*c* are respectively provided on upper opposite surfaces of the sensor blocks 50*a*, 50*b*, 50*c* from the surface of those sensor units on which the connection electrodes 13 of the sensor blocks 50*a*, 50*b*, 50*c* are formed. FIG. 28 shows a temperature sensor unit 50*a* having an upper surface with a ring-like raise 51*a* formed thereon.

Figure 29:
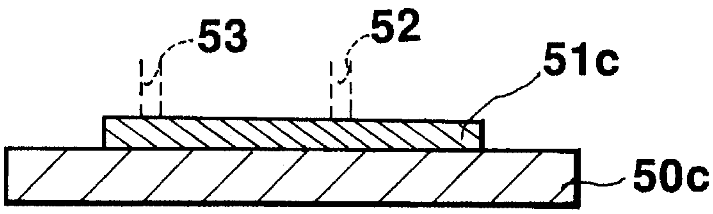
FIG. 29 is a plan view of a barometric pressure sensor unit.

FIG. 29 shows a barometric pressure sensor unit 50*b* having an upper surface with a disk-like raise 51*b* having a diameter which is one half of the outer diameter of the sensor unit 50*b*.

Figure 30:
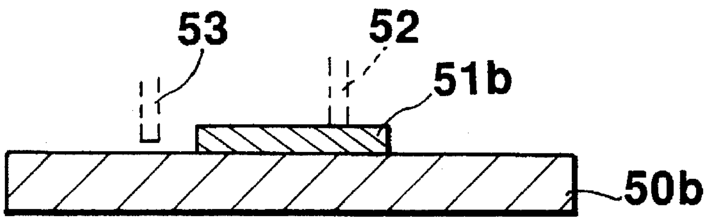
FIG. 30 is a plan view of an azimuth sensor unit.

FIG. 30 shows an azimuth sensor unit 50*c* having an upper surface with a disc-like raise 51*c* having a diameter somewhat smaller than the diameter of the sensor unit 50*c*.

Figure 27:
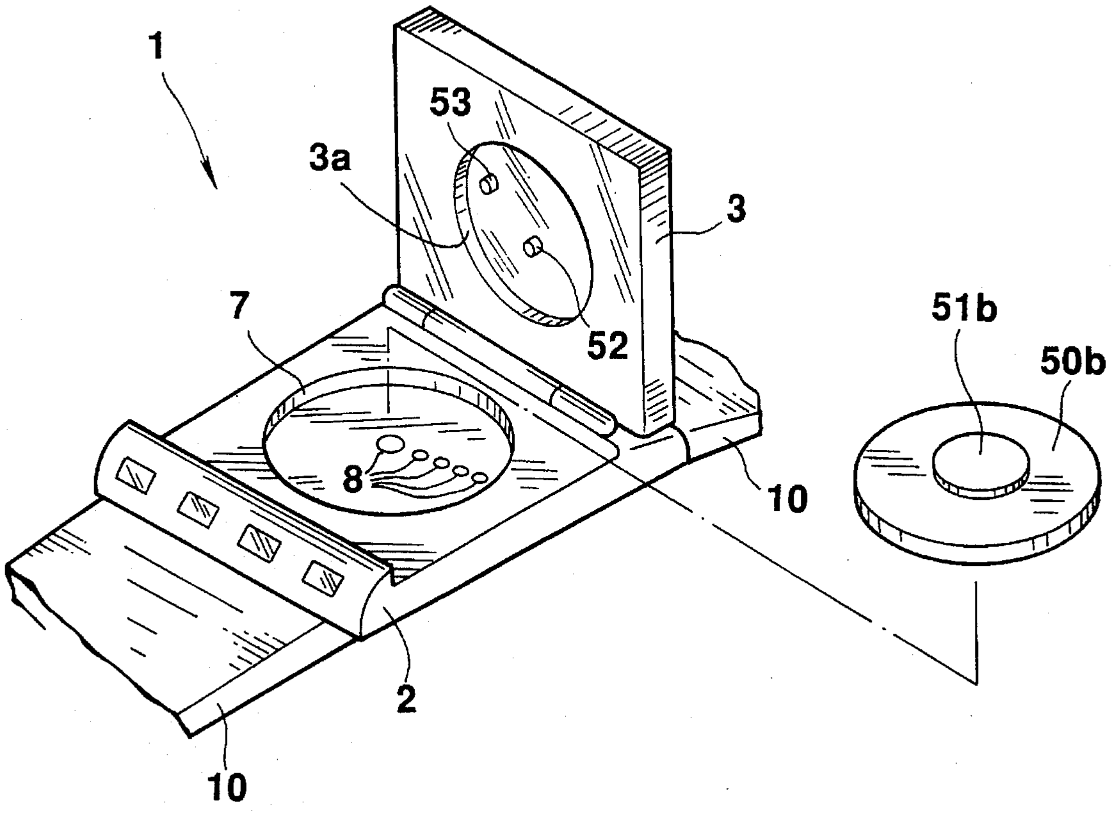
FIG. 27 is a perspective view of a third embodiment of the electronic device having a sensor function according to the present invention with its closure being open.
Figure 32:
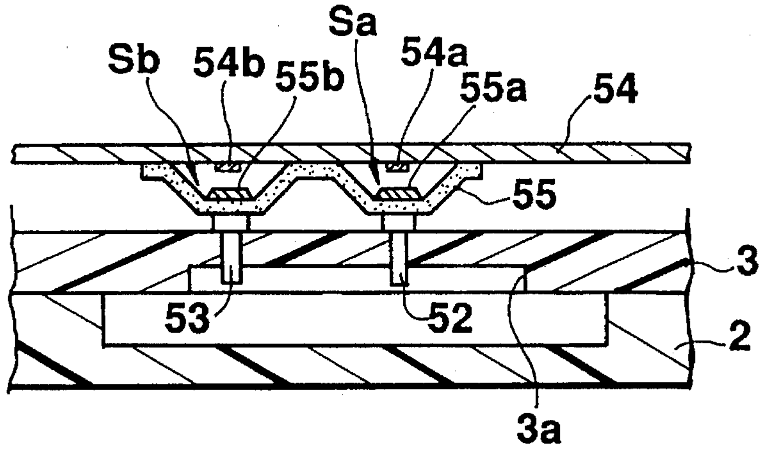
FIG. 32 is a cross-sectional view of an essential portion of the electronic device of FIG. 27 with no sensor unit being accommodated in the recess.

As shown in FIGS. 27 and 32, a circular recess 3*a* smaller than the recess 7 is formed on the lower surface of the closure 3. Two operating members 52, 53 are inserted through corresponding through holes provided in the bottom of the recess 3*a* so as to extend from the bottom surface of the recess 3*a*.

As shown in FIGS. 28–30, the operating member 52 is provided at a position within the inner periphery of the ring-like raise 51*a* of the temperature sensor 50*a* and within the extent of the smaller-diametric raise 51*b* of the barometric pressure block 50*b*.

The operating member 53 is provided at a position outside the smaller-diametric raise 51*b* of the temperature sensor 50*b* and within the extent of the larger-diametric raise 51*c* of the azimuth sensor block 50*c*.

Provided within the closure 3 is a circuit board 54, which is provided with fixed contacts 54*a*, 54*b* corresponding to the operating members 52, 53, respectively. Attached to a lower surface of the circuit board 54 is an insulating rubber support 55 with movable contacts 55*a*, 55*b* made of an electrically conductive rubber and corresponding to the fixed contacts 54*a*, 54*b*, respectively.

A switch Sa is composed of the operating member 52, movable contact 55*a* and fixed contact 54*a* while a switch Sb is composed of the operating member 53, movable contact 55*b* and fixed contact 54*b*.

Figure 31:
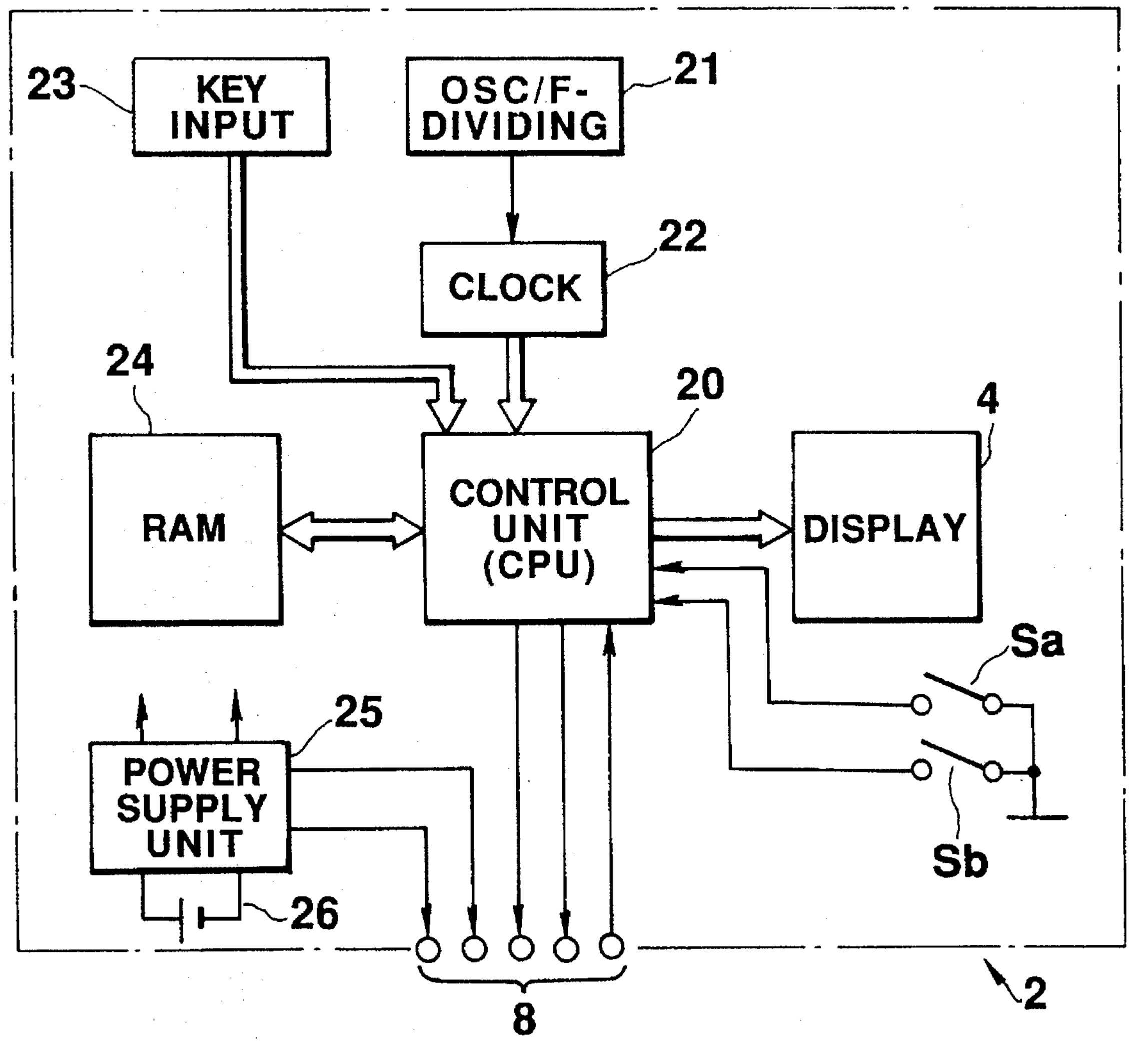
FIG. 31 is a block diagram of the internal structure of the electronic device of FIG. 27.

FIG. 31 is a block diagram indicative of the circuit structure of the electronic device of the third embodiment. The third embodiment includes a combination of the electronic device of the first embodiment of FIG. 6 and the switches Sa, Sb, the operational output of which are delivered to the control unit 20.

Figure 33:
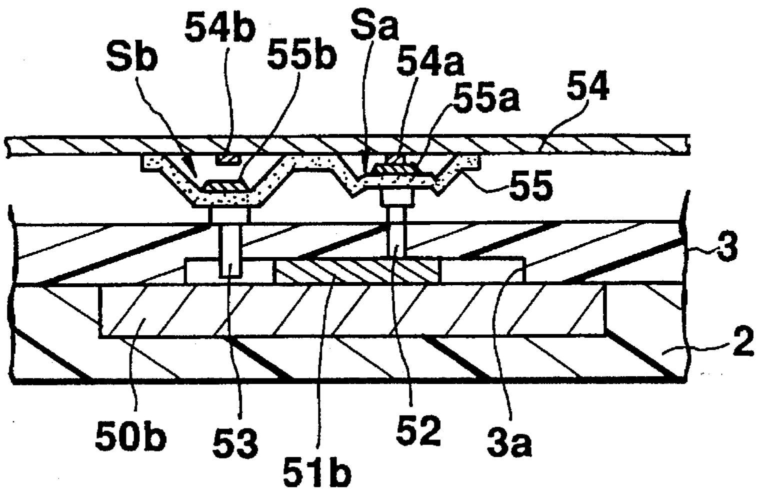
FIG. 33 is a cross-sectional view of an essential portion of the electronic device of FIG. 27 with a barometric pressure sensor unit being accommodated in the recess.

When the barometric pressure sensor unit 50*b* of FIG. 29 is accommodated in the recess 7 and the closure 3 is closed, the operating member 52 is moved upward while the operating member 53 remains stopped since the raise 51*b* is provided at the center of the sensor unit 50*c*, as shown in FIG. 33. When the operating member 52 is moved, the rubber support 55 is deformed and the movable contact 55*a* of the support 55 contacts the fixed contact 54*a* of the circuit board 54, so that the switch Sa is closed. In this case, the control unit 20 of FIG. 31 senses that the switch Sa is on and the switch Sb is off to thereby sense the barometric pressure. Similarly, when the temperature sensor unit 50*a* is accommodated in the recess 7, the switch Sa is switched off, the switch Sb is switched on. When the azimuth sensor unit 50*c* is accommodated in the recess 7, both the switches Sa, Sb are switched on. Thus, the sensor unit 9 accommodated in the recess 7 can be determined and a process is performed in accordance with the result of the determination.

The present invention is not limited to the above embodiments and may be modified in various manners. For example, the present invention is similarly applicable to other electronic devices such as electronic notes, portable communication devices such as portable telephone sets or pagers, word processors, personal computers and various kinds of clocks in addition to the wrist watches. The sensors used may be ones which measure humidity, magnetism, acceleration, gradient or oxygen concentration.

What is claimed is:

1. An electronic device comprising:

casing means;

sensor unit means, detachably mounted as a unit on said casing means, said sensor unit means including sensor element means, analog/digital converting means for converting an output of said sensor element means into a digital signal, output electrodes, and control means for outputting the digital signal from said output electrodes; and display means provided on said casing means, for displaying measurement data obtained by said sensor element means based on the digital signal outputted from said output electrodes of said sensor unit means.

2. An electronic device according to claim 1, wherein said sensor unit means further includes driving circuit means for driving said sensor element means, and said electronic device further comprising driving signal supplying means provided in said casing means, for supplying a driving signal to said driving circuit means of said sensor unit means.

3. An electronic device according to claim 1, wherein said sensor unit means comprises a disc-type member.

4. An electronic device according to claim 3, wherein;

said disc-type member has top and bottom circular flat surfaces; and said disc-type member comprises a plurality of connecting terminals disposed concentrically on one of the top and bottom circular flat surfaces thereof.

5. An electronic device according to claim 2, further comprising power supply means provided in said casing means, for supplying power to said driving circuit means of said sensor unit means.

6. An electronic device according to claim 1, further comprising:

time counting means provided in said casing means, for counting the present time; and current-time display control means provided in said casing means, for displaying on said display means the current time counted by said time counting means.

7. An electronic device according to claim 1, further comprising a band attached to said casing means for attaching the electronic device on a user.

8. An electronic device according to claim 1, wherein:

said sensor unit means further includes storage means for storing said digital signal generated by said analog/digital converting means; and said electronic device further comprising display control means provided in said casing means, for displaying data based on said digital signal stored in said storage means on said display means provided on the casing means.

9. An electronic device comprising:

casing means;

a plurality of sensor unit means adapted to be detachably received in said casing means, each sensor unit means including:

an identification portion which is different from identification portions of other sensor unit means, for identification;

a sensor element means which is different from sensor element means of other sensor unit means;

analog/digital converting means for converting an output of said each sensor unit means into a digital signal;

output electrodes; and control means for outputting the digital signal converted by said analog/digital converting means from said output electrodes;

determining means provided in said casing means, for, when one of said plurality of sensor unit means selected by a user is mounted to said casing means, sensing the identification portion of the sensor unit means received by said casing means to determine which one of the plurality of sensor unit means is mounted to said casing means; and display means provided on said casing means, for displaying measurement data obtained by said sensor element means based on the digital signal output from said output electrodes of said sensor unit means.

10. An electronic device according to claim 9, further comprising driving-signal selecting means provided in said casing means, for selectively supplying a relevant driving signal to the sensor unit means based on the determination made by said determining means.

11. An electronic device according to claim 9, wherein said identification portion of the sensor unit means comprises a different-shape projection provided thereon.

12. An electronic device according to claim 9, wherein;

said plurality of sensor unit means each further include driving circuit means for driving said sensor element means; and said electronic device further comprising driving signal supplying means provided in said casing means, for supplying a driving signal to said driving circuit means said sensor unit means mounted to said casing means.

13. An electronic device according to claim 9, wherein said sensor unit comprises disc-type members.

14. An electronic device according to claim 13, wherein;

said disc-type member has top and bottom circular flat surfaces; and said disc-type member comprises a plurality of connecting terminals disposed concentrically on one of the top and bottom circular flat surfaces thereof.

15. An electronic device according to claim 12, further comprising power supply means provided in said casing means, for supplying power to said driving circuit means of said sensor unit means mounted on said casing means.

16. An electronic device according to claim 9, further comprising:

time counting means provided in said casing means, for counting the present time; and current-time display control means provided in said casing means, for displaying on said display means the current time counted by said time counting means.

17. An electronic device according to claim 9, further comprising a band attached to said casing means for attaching the electronic device on a user.

18. An electronic device according to claim 9, wherein;

each of said plurality of sensor unit means further includes storage means for storing said digital signal generated by said analog/digital converting means; and said electronic device further comprising display control means provided in said casting means, for displaying data based on said digital signal stored in storage means on said display means provided on the casing means.

* * * * *